US012390389B2

(12) United States Patent
Anderson

(10) Patent No.: US 12,390,389 B2
(45) **Date of Patent: *Aug. 19, 2025**

(54) APPARATUS FOR TREATING KNEE ABNORMALITIES

(71) Applicant: ERGO-FLEX Technologies, LLC, Conroe, TX (US)

(72) Inventor: J. T. Anderson, Conroe, TX (US)

(73) Assignee: Ergo-Flex Technologies, LLC, Conroe, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/481,149

(22) Filed: Sep. 21, 2021

(65) Prior Publication Data

US 2022/0000697 A1 Jan. 6, 2022

Related U.S. Application Data

(63) Continuation of application No. 15/449,674, filed on Mar. 3, 2017, now Pat. No. 11,123,253.

(51) Int. Cl.
*A61H 1/02* (2006.01)
*A63B 23/04* (2006.01)

(52) U.S. Cl.
CPC ............... *A61H 1/024* (2013.01); *A61H 1/02* (2013.01); *A61H 1/0237* (2013.01); *A63B 23/04* (2013.01); *A63B 23/0494* (2013.01); *A61H 2201/0103* (2013.01); *A61H 2201/0149* (2013.01); *A61H 2201/0192* (2013.01);
(Continued)

(58) Field of Classification Search
CPC .. A61H 1/02; A61H 1/024; A61H 2201/0103; A61H 2201/0149; A61H 2201/0192; A61H 2201/1207; A61H 2201/1623; A61H 2201/1633; A61H 2201/1642; A61H 2201/1664; A61H 2201/50; A61H 2201/5061; A61H 2203/0437; A63B 17/04; A63B 2023/006; A63B 21/00178; A63B 21/00181; A63B 21/00185; A63B 21/1609; A63B 21/4001; A63B 21/4011; A63B 2210/02; A63B 2210/50; A63B 23/03508; A63B 23/0494;
(Continued)

(56) References Cited

U.S. PATENT DOCUMENTS 2,924,214 A * 2/1960 Zak ...................... A61H 1/0259 482/80
3,749,400 A * 7/1973 Stoffel ................ A63B 21/023 482/130

(Continued)

OTHER PUBLICATIONS

Article published by Neck Solutions, "The Traction Knee Brace is a New Way to Treat Arthritis of the Knee Using a Tractioning System", dated May 9, 2015.

(Continued)

*Primary Examiner* — Justine R Yu
*Assistant Examiner* — Matthew R Moon
(74) *Attorney, Agent, or Firm* — Tumey L.L.P.

(57) ABSTRACT

A method of treating knee abnormalities includes securing the portion of the leg above the knee to a stationary object and securing the portion of the leg below the knee to a movable support. A force is applied to the movable support to stretch the knee joint. Apparatus for carrying out the method is also disclosed.

19 Claims, 5 Drawing Sheets

(52) U.S. Cl.
CPC ................ *A61H 2201/1207* (2013.01); *A61H 2201/1623* (2013.01); *A61H 2201/1633* (2013.01); *A61H 2201/1642* (2013.01); *A61H 2201/1664* (2013.01); *A61H 2201/50* (2013.01); *A61H 2201/5061* (2013.01); *A61H 2203/0437* (2013.01)

(58) Field of Classification Search
CPC .............. A63B 69/0057; A61G 7/0755; A61G 13/1245; A61G 13/125
USPC ................................................ 601/23, 33–34
See application file for complete search history.

(56) References Cited

U.S. PATENT DOCUMENTS

| | | | | | |
|---|---|---|---|---|---|
| 3,911,908 | A * | 10/1975 | Duke | A61H 1/0214 | 601/32 |
| 4,549,534 | A * | 10/1985 | Zagorski | A61H 1/0259 | 601/104 |
| 4,569,336 | A * | 2/1986 | Wheeler | A61H 1/0262 | 434/255 |
| 4,637,379 | A * | 1/1987 | Saringer | A61H 1/0259 | 601/34 |
| 4,768,834 | A * | 9/1988 | Walsh | A47C 9/002 | D6/334 |
| 4,772,015 | A * | 9/1988 | Carlson | A63B 21/4047 | 482/902 |
| 4,776,587 | A * | 10/1988 | Carlson | A63B 23/03525 | 601/24 |
| 5,050,589 | A | 9/1991 | Engle | | |
| 5,209,223 | A * | 5/1993 | McGorry | A63B 23/00 | 482/133 |
| 6,019,423 | A * | 2/2000 | Dodge | B62J 1/02 | 297/214 |
| 7,621,852 | B2 * | 11/2009 | Bowser | A63B 23/12 | 482/121 |
| 9,205,015 | B2 * | 12/2015 | Guillen | A61H 1/00 | |
| 11,123,253 | B2 * | 9/2021 | Anderson | A61H 1/02 | |
| 2003/0120186 | A1 * | 6/2003 | Branch | A61H 1/0259 | 601/5 |
| 2003/0144613 | A1 * | 7/2003 | Kitada | A61H 1/0218 | 601/24 |
| 2003/0162636 | A1 * | 8/2003 | West | A61H 3/008 | 482/69 |
| 2012/0078142 | A1 * | 3/2012 | Fenkell | A61H 1/024 | 601/5 |
| 2012/0232438 | A1 * | 9/2012 | Cataldi | A63B 21/4045 | 601/5 |
| 2012/0253254 | A1 * | 10/2012 | Rocklin | A61H 1/0218 | 602/32 |
| 2014/0088466 | A1 * | 3/2014 | Hansen | A61G 13/009 | 482/129 |
| 2014/0094721 | A1 * | 4/2014 | Diallo | A63B 24/0087 | 601/5 |
| 2014/0135174 | A1 * | 5/2014 | Potash | A63B 21/0058 | 482/8 |

OTHER PUBLICATIONS

USPTO Non-Final Office Action for U.S. Appl. No. 15/449,674 dated Oct. 9, 2019.

USPTO Final Office Action for U.S. Appl. No. 15/449,674 dated Mar. 25, 2020.

USPTO Notice of Allowance for U.S. Appl. No. 15/449,674 dated May 25, 2021.

USPTO Issue Notification for U.S. Appl. No. 15/449,674 dated Sep. 1, 2021.

* cited by examiner

APPARATUS FOR TREATING KNEE ABNORMALITIES

This Continuation application claims priority to U.S. Non-Provisional application Ser. No. 15/449,674 filed on Mar. 3, 2017, the entire contents of which is hereby incorporated by reference thereto.

I. BACKGROUND OF INVENTION

1. Field of the Invention

This invention relates to a mechanized therapeutic device and a method for treating knee abnormalities. The device includes a support for a patient and a mechanism for creating a tension force on the knee when a patient's leg is in an extended condition.

The invention disclosed herein offers benefits for those suffering with chronic knee pain due to osteoarthritis, previous injury, failed surgery and more. Studies show that mechanical traction is more effective at decreasing pain, improving range of motion, and improving quality of life than ultrasound and exercise combined.

A knee injury can affect any of the ligaments, tendons or fluid-filled sacs (bursae) that surround a knee joint as well as the bones, cartilage and ligaments that form the joint itself. Some of the more common knee injuries include:

ACL injury. An ACL injury is the tearing of the anterior cruciate ligament (ACL)—one of four ligaments that connect the shinbone to the thighbone. An ACL injury is particularly common in people who play basketball, soccer others sports that require sudden changes in direction.

Fractures. The bones of the knee, including the kneecap (patella), can be broken during motor vehicle collisions or falls. People whose bones have been weakened by osteoporosis can sometimes sustain a knee fracture simply by stepping wrong.

Torn Meniscus. The meniscus is formed of tough, rubbery cartilage and acts as a shock absorber between the shinbone and thighbone. It can be torn if the knee is suddenly twisted while bearing weight on it.

Knee Bursitis. Some knee injuries cause inflammation in the bursae, the small sacs of fluid that cushion the outside of the knee joint so that tendons and ligaments glide smoothly over the joint Patellar tendinitis. Tendinitis is irritation and inflammation of one or more tendons—the thick, fibrous tissues that attach muscles to bones. Runners, skiers, cyclists, and those involved in jumping sports and activities are prone to develop inflammation in the patellar tendon, which connects the quadriceps muscle on the front of the thigh to the shinbone.

Some examples of mechanical problems that can cause knee pain include:

Loose body. Sometimes injury or degeneration of bone or cartilage can cause a piece of bone or cartilage to break off and float in the joint space. This may not create any problems unless the loose body interferes with knee joint movement, in which case the effect is something like a pencil caught in a door hinge.

Iliotibial band syndrome. This occurs when the tough band of tissue that extends from the outside of the hip to the outside of the knee (iliotibial band), becomes so tight that it rubs against the outer portion of the femur. Distance runners are especially susceptible to iliotibial band syndrome.

Dislocated kneecap. This occurs when the triangular bone (patella) that covers the front of the knee slips out of place usually to the outside of the knee. In some cases the kneecap may stay displaced.

Hip or foot pain. If hip or foot pain is present, it may change the way one walks to spare these painful joints. But this altered gait can place more stress on the knee joint. In some cases, problems in the hip or foot can refer pain to the knee.

More than 100 different types of arthritis exist. The varieties most likely to affect the knee include:

Osteoarthritis (OA). Sometimes called degenerative arthritis, osteoarthritis is the most common type of arthritis. It's a wear-and-tear condition that occurs when the cartilage in the knee deteriorates with use and age.

Rheumatoid arthritis. The most debilitating form of arthritis, rheumatoid arthritis is an autoimmune condition that can affect almost any joint in the body, including knees. Although rheumatoid arthritis is a chronic disease, it tends to vary in severity and may even come and go.

Gout. This type of arthritis occurs when uric acid crystals build up in the joint. While gout most commonly affects the big toes, it can also occur in the knee.

Pseudogout. Often mistaken for gout, pseudogout is caused by calcium-containing crystals that develop in the joint fluid. Knees are the most common joint affected by pseudogout.

Septic arthritis. Sometimes the knee joint can become infected, leading to swelling, pain and redness. There's usually no trauma before the onset of pain. Septic arthritis often occurs with fever.

Patellofemoral pain syndrome is a general term that refers to pain arising between your patella and the underlying thighbone (femur). It's common in athletes; in young adults, especially those who have a slight maltracking of the kneecap; and in older adults, who usually develop the condition as a result of arthritis of the kneecap.

The most common conditions that can be treated by the invention include: From a clinical point of view, joint distraction as a treatment for osteoarthritis (OA) of hip and ankle has been demonstrated to be very promising. Pain, reduced joint mobility and decreased functional ability are the most common complaints for a patient with severe OA. Traction therapy has been shown to increase osteogenesis, angiogenesis, and improve viscoelastic properties. OA will be the most commonly treated knee problem with the invention.

This invention is particularly effective for treating moderate to severe osteoarthritis that requires load reduction to the affected medical and lateral compartments of the knee. The invention provides decompression to the knee joint by re-establishing the natural space and cushioning that's missing between the femur and the tibia when afflicted with osteoarthritis. Any loss of cartilage between the knee joint or even a sudden increase in weight can strain the knee and cause painful inflammation.

The invention will be most effective with mild to moderate OA of the knee, however, severe OA can experience significant improvement, especially when combined with other modalities such as laser therapy. Mild disease is defined as being confined to the upper third of the cartilage; moderate disease extends up to two-thirds of the cartilage, while severe disease extends beyond these anatomical limits.

Osteochondritis dissecans is a joint condition in which bone underneath the cartilage of a joint dies due to lack of blood flow. This bone cartilage can then break loose, causing pain and possibly hinder joint motion.

Osteochondritis dissecans occurs most often in children and adolescents. It can cause symptoms either after an injury to a joint or after several months of activity, especially high impact activity such as jumping and running that affects the joint. The condition occurs most commonly in the knee, but also occurs in elbows, ankles and other joints. The invention is an effective treatment option if the bone or cartilage is attached.

The Meniscus is a piece of cartilage that provides a cushion between the thighbone (femur) and shinbone (tibia). There are two menisci in each knee joint. They can be damaged or torn during activities that put pressure on or rotate the knee joint. Taking a hard tackle on the football field or sudden pivot on the basketball court can result in a meniscus tear.

Due to the angiogenesis effects of traction and laser treatments, meniscus tears generally respond very well to the treatment. It has been noted that 50% of meniscus tears will heal on their own, however, this is done in a very slow manner due to the lack of adequate blood supply to the cartilage. Traction therapy had been shown to increase blood flow, thereby, decreasing healing times.

Sprains/strains are the most common injury to the knee. The invention will provide a treatment option after the acute phase has ended. Intermittent traction is necessary to create the proper motion needed for soft tissue repair.

2. Description of Related Art

Traction therapy has been successfully used for decades in the treatment of cervical and lumbar spine injuries and conditions. Surgical traction of the knee and hips have also shown promising results with osteogenic, angiogenic, and visco-elastic changes due to joint traction/distraction. Although attempted, devices that provide non-surgical mechanical traction to the knee or hip, have been very limited until now. With the advent of the present invention, this type of treatment modality can effectively be performed in a clinical setting that allows a reproducible and repeatable option to obtain the benefits of tractions therapy to the knee.

II. BRIEF SUMMARY OF THE INVENTION

The invention disclosed herein includes a mechanism for securing a portion of a leg above the knee to a stationary object and securing a portion of the leg below the knee to a movable object with the leg in a generally fully extended condition. A variable tension force can be applied to the lower leg securing mechanism to thereby stretching the knee joint in an axial direction with respect to the extended leg.

The stretching of the knee joint in an axial direction helps to increase the blood flow within the knee thereby stimulating tissue growth and lubricating the knee both of which alleviate knee abnormalities as discussed above.

III. BRIEF DESCRIPTION OF THE DRAWINGS

IV. DETAILED DESCRIPTION OF THE INVENTION WITH REFERENCE TO THE DRAWINGS

Figure 1:
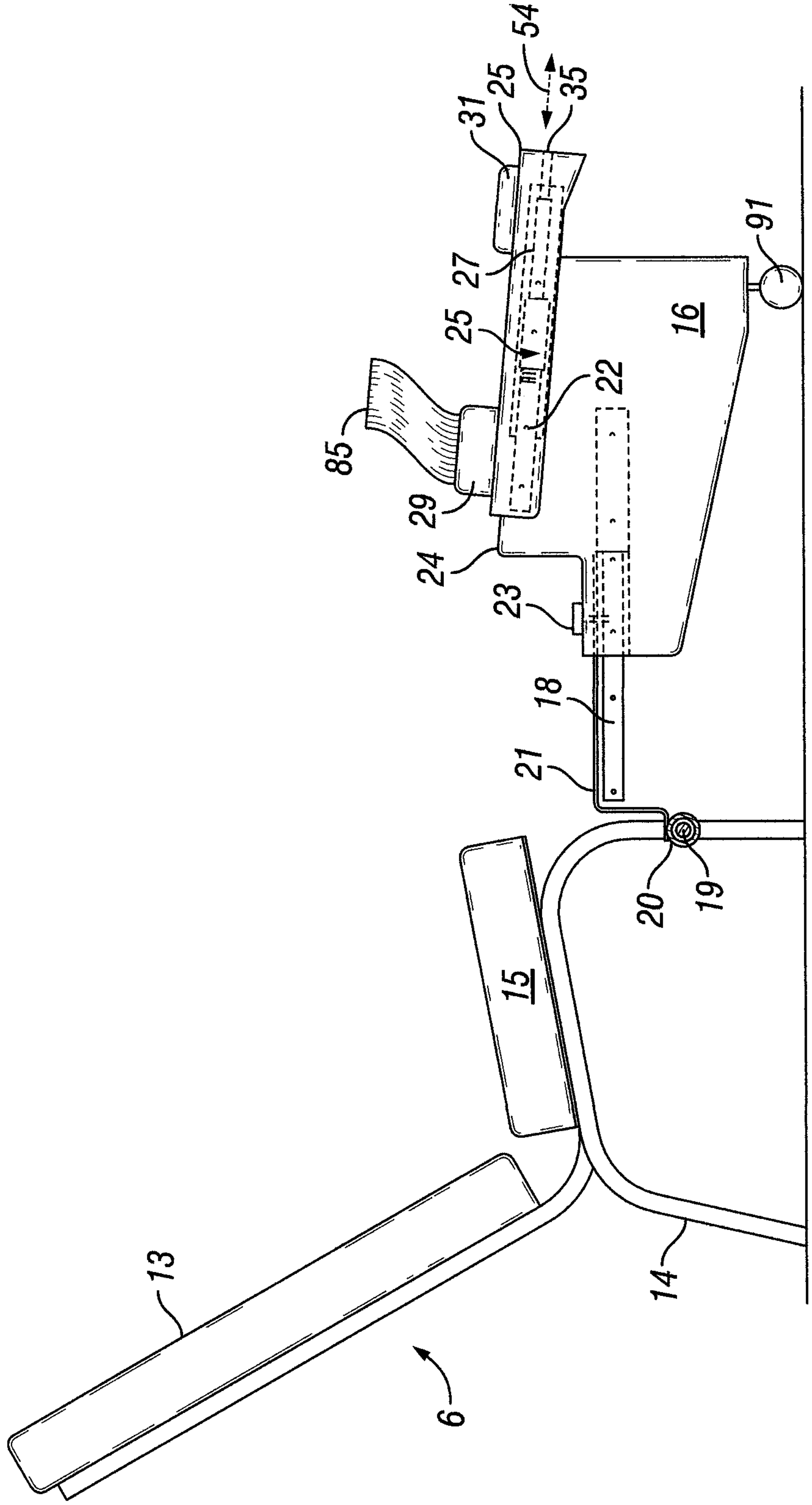
FIG. 1 is a side view of an embodiment of the invention.
Figure 2:
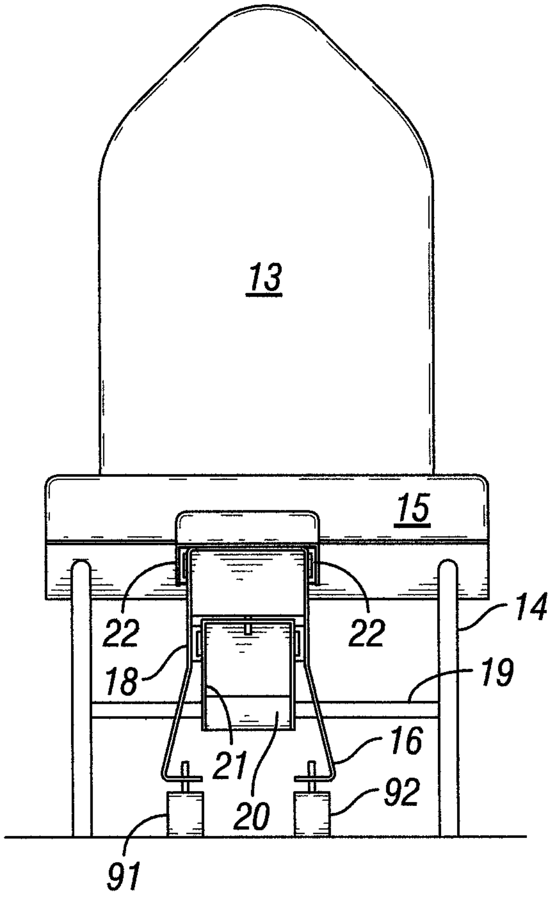
FIG. 2 is a frontal view of the embodiment of FIG. 1.
Figure 3:
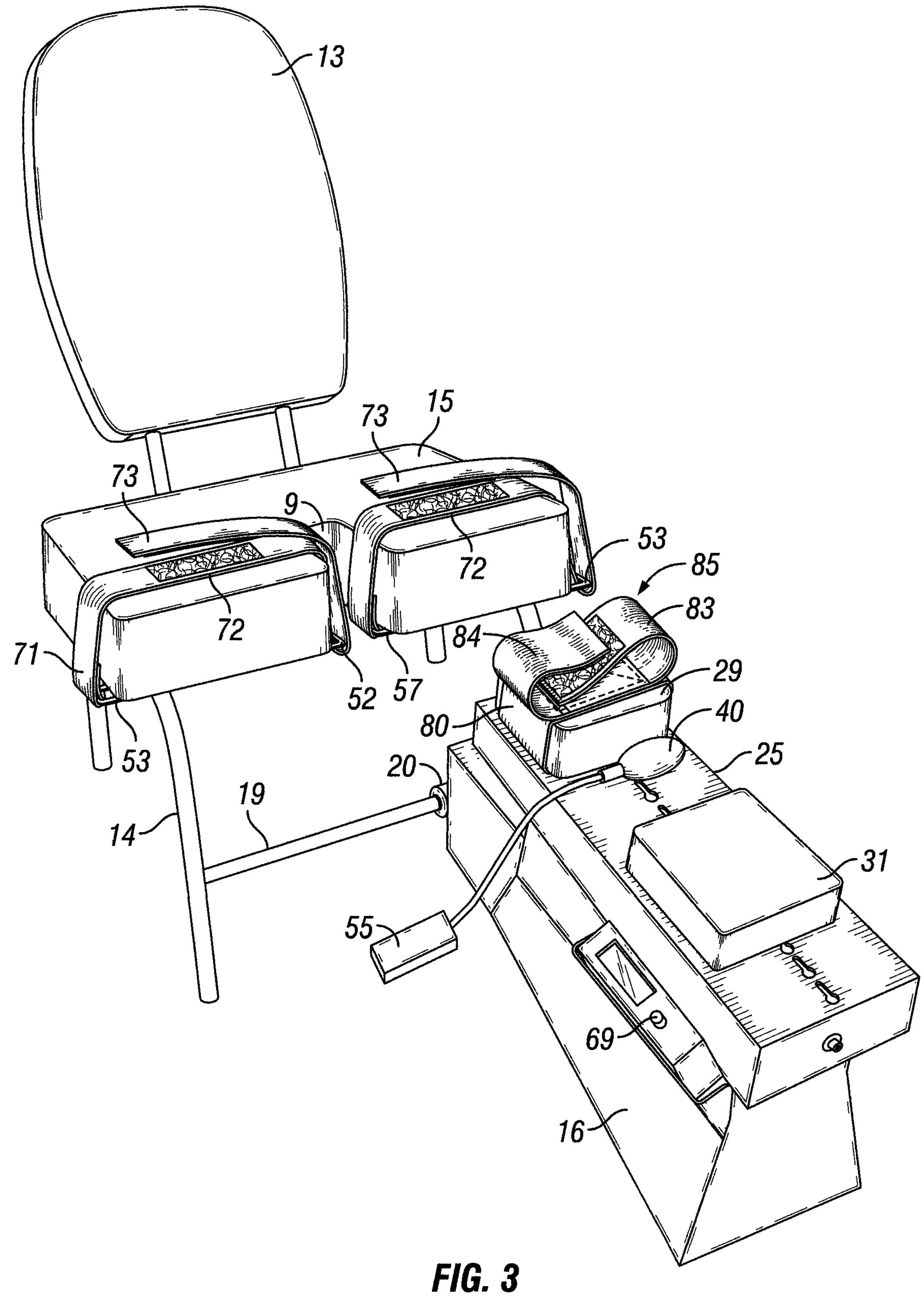
FIG. 3 is a perspective view of an embodiment of the invention.

As shown in FIGS. 1 and 3, an embodiment of the invention includes two components fixed together. The first component 6 is a seating arrangement for the patient. It includes a support frame 14, a back rest 13, and a seating surface 15. Support frame 14 includes a laterally extending rod 19.

Seating arrangement 6 also includes a u-shaped cut out section 9 (FIG. 3) in a middle portion of the seat to accommodate a pair of strap guiding bars 52, 57 secured to the frame. The two sides of the chair include a support bar 53 to which a first end of the straps 71 are secured to. Portion 72 of the strap is adapted to be placed over the patient's upper leg portion, through loop 52 and then back over portion 72 as shown at 73.

Figure 4:
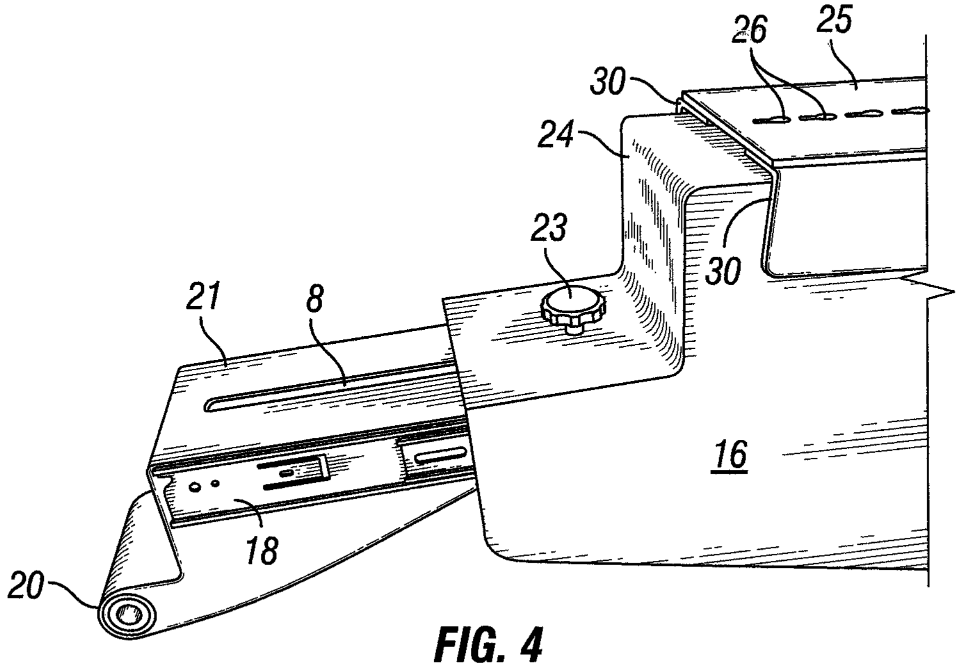
FIG. 4 is a perspective of a portion of the apparatus.

The lower leg support and stretching component includes a first guide housing 21 as shown in FIG. 4 that includes a tubular bearing 20 that is adapted to slide laterally on rod 19. A main housing member 16 which includes ground engaging rollers 91, 92 is slideably attached to guide housing 21 by conventional side tracks 18 which slide in complementary shaped tracks attached to an inner wall of main housing 16. The axial position of main housing 16 with respect to guide housing 21 can be adjust by turning a knob 23 which has a pin sliding in slot 8 provided in the top surface of guiding housing 21. The pin is threaded to receive a nut which slides under slot 8.

Figure 5:
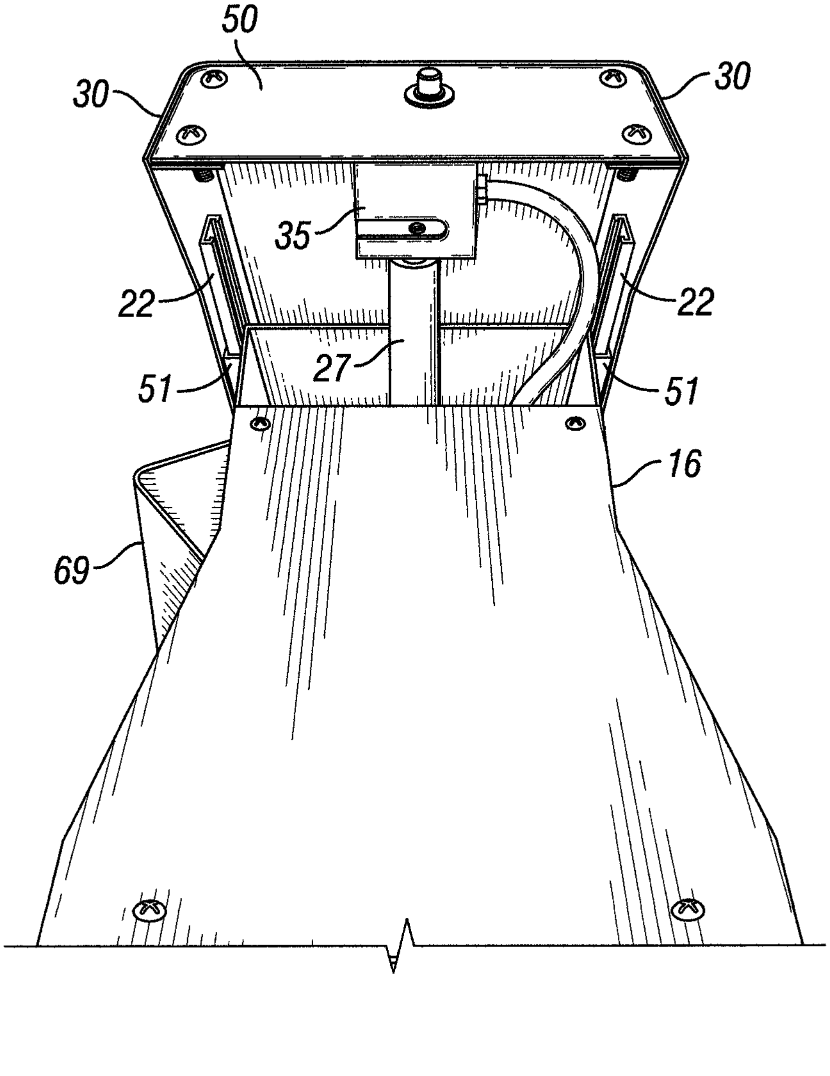
FIG. 5 is a perspective view of the extension mechanism for the lower leg support member.
Figure 6:
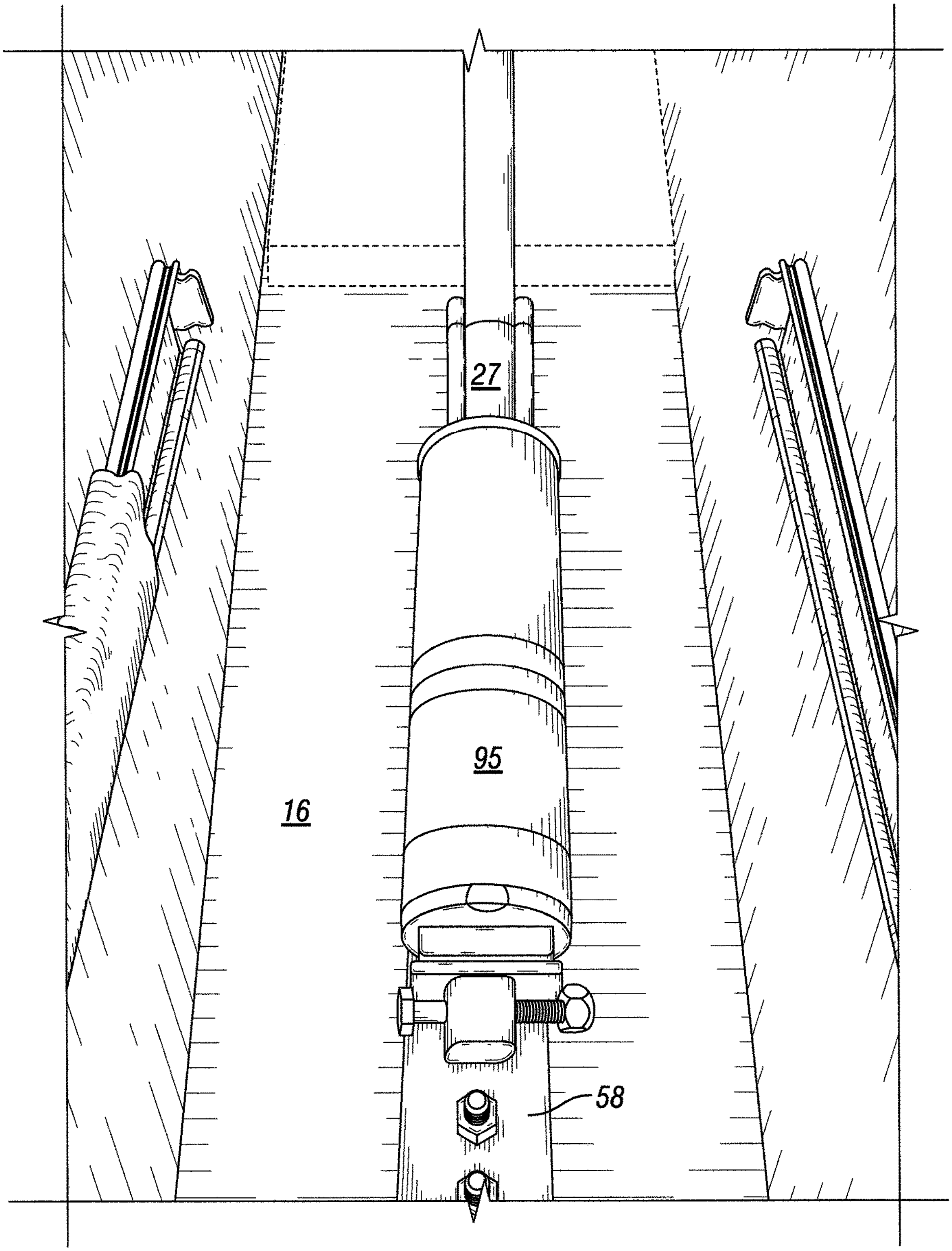
FIG. 6 is a perspective view of the front portion of the extender attached to the underside of the main housing member.

A lower leg support platform 25 is slideably mounted on the main housing 16 and includes a pair of downwardly extending side flaps 30. A plurality of adjustment holes 26 are located on the top surface of support platform 25. Holes 26 includes a slot portion and an enlarged portion to accommodate pins, which have an enlarged head portion, extending downwardly from cushions 29, 31 in a known manner. A first strap 80 tightly surrounds and is attached to cushion 29. A second strap 85 having end portions 83, 84 is secured to the top portion of first strap 80. Hook and loop fasteners are provided on end portions 83, 84 respectively so that the lower portion of the leg below the knee can be secured to cushion 29 which is secured to platform 25. Cushion 31 is for supporting the patient's foot and is optional. It may also include a securing strap. The support platform 25 includes side mounted tracks 22 as shown in FIGS. 1 and 5 that slide within complimentary shaped rails 51 secured to the outer surface of main housing 16. Rails and tracks that are commonly used in desk drawers may be used as an example, however any known mechanism for slideably supported one member within another may be used.

Lower leg supporting platform 25 includes an end plate 50 as shown in FIG. 5. One end 27 of a progressive force linear actuator available from Progressive Automations is connected to end plate 50 via a force sensor 35. The other end 95 of the linear actuator is fixed to the underside of top surface 24 of main housing 16 by a bracket 58. Thus extension of the linear actuator will cause support platform 25 to move with respect to main housing 16 in an axial direction as depicted at 54 in FIG. 1.

V. MODE OF OPERATION

In operation, a patient is seated and the leg is fully extended so that the lower portion of the leg below the knee is supported by cushion 29 and the foot rests on cushion 31. Housing 16 may be axially adjusted as necessary as shown at 55. Housing 16 is laterally moved so as to be aligned with the knee to be treated. The upper portion of a leg is secured to the chair frame 14 by a strap having hooks and loops fasteners for example. The strap may be mounted on one side of the chair at 53, placed over the knee at 72 and through the space between bar 52 and the U-shaped cutout, and then tightened folded back over the knee at 73 and secured to section 72 by a hook and loop fastener.

The lower portion of the leg is secured to the movable platform 25 on cushion 29 in a similar manner, however the arrangement for securing both portions of the leg to the chair support frame and the moveable support platform may include any known arrangement.

Optionally an inflatable bladder 55 having an air pump 40 may be positioned between the leg portion and the strap to firmly secure the leg portion to the support platform. With the leg secured above and below the knee, a linear force is applied to the knee via linear actuator 95, 27 and support platform 25 which results in the knee joint being stretched between 0.0 and 10 millimeters for example. The amount of force, duration of the force and intervals between the application of force can be varied by a suitable control mechanism known in the art. The amount of force applied may be in the range of five to thirty pounds, for example with intervals of 0 to thirty seconds, again for example. For a given cycle the applied force can vary from a given starting value to a greater end value, for example eighteen to twenty-two pounds. A control module 69 is attached to housing 16 for inputting data into a central processor which controls movement of the linear actuator.

What is claimed:

1. A method of treating an injury in a knee of a human, comprising:

a) securing a portion of a leg above the knee to a stationary object, wherein the stationary object comprises a support frame, a back rest, a seating surface, a u-shaped cut-out section, and two straps, wherein the support frame includes a laterally extending rod and two strap guiding bars secured to the support frame, and further wherein the support frame includes two support bars, wherein each of the two support bars is positioned on opposite sides of the support frame, and further wherein the u-shaped cut-out section is positioned in a middle portion of the seating surface accommodating the two strap guide bars, and further wherein a first end of each of the two straps is secured to one of the support bars, and further wherein a portion of one of the two straps is placed over the leg above the knee and through one of the guiding bars;

b) securing a portion of a leg below the knee and above an ankle to a support member by a securing mechanism, wherein the support member is axially movable with respect to the stationary object, and wherein the securing mechanism is axially movable with respect to the support member, and further wherein the support member includes a first guide housing, wherein the first guide housing includes a tubular bearing that slides laterally on the laterally extending rod, and further wherein the support member includes a main housing member, wherein the main housing member comprises ground-engaging rollers, and further wherein the main housing member is slideably attached to the first guide housing by side tracks; and c) applying a tension force to the knee via one or more linear actuators and the support member, whereby adjacent bone surfaces of the knee are stretched in an axial direction, wherein an amount of tension force, a duration of the tension force, and a plurality of intervals between the application of the tension force is varied by a control module, wherein the control module is attached to the main housing member, and further wherein the control module receives data and controls the movement of the one or more linear actuators.

2. The method of claim 1, wherein the injury comprises an anterior cruciate ligament (ACL) injury.

3. The method of claim 1, wherein the injury comprises a fracture.

4. The method of claim 1, wherein the injury comprises a torn meniscus.

5. The method of claim 1, wherein the injury comprises knee bursitis.

6. The method of claim 1, wherein the injury comprises patellar tendinitis.

7. A method of treating a mechanical problem in a knee of a human, comprising:

a) securing a portion of a leg above the knee to a stationary object, wherein the stationary object comprises a support frame, a back rest, a seating surface, a u-shaped cut-out section, and two straps, wherein the support frame includes a laterally extending rod and two strap guiding bars secured to the support frame, and further wherein the support frame includes two support bars, wherein each of the two support bars is positioned on opposite sides of the support frame, and further wherein the u-shaped cut-out section is positioned in a middle portion of the seating surface accommodating the two strap guide bars, and further wherein a first end of each of the two straps is secured to one of the support bars, and further wherein a portion of one of the two straps is placed over the leg above the knee and through one of the guiding bars;

b) securing a portion of a leg below the knee and above an ankle to a support member by a securing mechanism, wherein the support member is axially movable with respect to the stationary object, and wherein the securing mechanism is axially movable with respect to the support member; and c) applying a tension force to the knee via the support member, whereby adjacent bone surfaces of the knee are stretched in an axial direction.

8. The method of claim 7, wherein the mechanical problem comprises a loose body.

9. The method of claim 7, wherein the mechanical problem comprises iliotibial band syndrome.

10. The method of claim 7, wherein the mechanical problem comprises a dislocated kneecap.

11. The method of claim 7, wherein the mechanical problem is caused by hip pain.

12. The method of claim 7, wherein the mechanical problem is caused by foot pain.

13. A method of treating arthritis in a knee of a human, comprising:

a) securing a portion of a leg above the knee to a stationary object, wherein the stationary object comprises a support frame, a back rest, a seating surface, a u-shaped cut-out section, and two straps, wherein the support frame includes a laterally extending rod and two strap guiding bars secured to the support frame, and further wherein the support frame includes two support bars, wherein each of the two support bars is positioned on opposite sides of the support frame, and further wherein the u-shaped cut-out section is positioned in a middle portion of the seating surface accommodating the two strap guide bars, and further wherein a first end of each of the two straps is secured to one of the support bars, and further wherein a portion of one of the two straps is placed over the leg above the knee and through one of the guiding bars;

b) securing a portion of a leg below the knee and above an ankle to a support member by a securing mechanism, wherein the support member is axially movable with respect to the stationary object, and wherein the securing mechanism is axially movable with respect to the support member, and further wherein the support member includes a first guide housing, wherein the first guide housing includes a tubular bearing that slides laterally on the laterally extending rod, and further wherein the support member includes a main housing member, wherein the main housing member comprises ground-engaging rollers, and further wherein the main housing member is slideably attached to the first guide housing by side tracks; and c) applying a tension force to the knee via the support member, whereby adjacent bone surfaces of the knee are stretched in an axial direction.

14. The method of claim 13, wherein the arthritis comprises osteoarthritis.

15. The method of claim 13, wherein the arthritis comprises rheumatoid arthritis.

16. The method of claim 13, wherein the arthritis comprises gout.

17. The method of claim 13, wherein the arthritis comprises pseudogout.

18. The method of claim 13, wherein the arthritis comprises septic arthritis.

19. The method of claim 13, wherein the arthritis comprises patellofemoral pain syndrome.

* * * * *